United States Patent
Rausch et al.

(10) Patent No.: US 7,542,412 B2
(45) Date of Patent: Jun. 2, 2009

(54) SELF-ROUTING, STAR-COUPLER-BASED COMMUNICATION NETWORK

(75) Inventors: Mathias Rausch, Markt Schwaben (DE); Christopher Temple, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 599 days.

(21) Appl. No.: 10/508,771

(22) PCT Filed: Nov. 1, 2002

(86) PCT No.: PCT/EP02/12277

§ 371 (c)(1),
(2), (4) Date: Jun. 9, 2005

(87) PCT Pub. No.: WO03/081849

PCT Pub. Date: Oct. 2, 2003

(65) Prior Publication Data

US 2005/0243715 A1      Nov. 3, 2005

(30) Foreign Application Priority Data

Mar. 22, 2002   (GB)  ................................ 0206732.0

(51) Int. Cl.
*H04J 1/16* (2006.01)
(52) U.S. Cl. ................. 370/216; 370/217; 370/225; 370/228; 370/238; 370/400
(58) Field of Classification Search ............. 370/216, 370/217, 225, 228, 238, 400, 407
See application file for complete search history.

(56) References Cited

U.S. PATENT DOCUMENTS

| | | | | |
|---|---|---|---|---|
| 4,701,756 A | * | 10/1987 | Burr | 340/825.02 |
| 5,341,232 A | | 8/1994 | Popp | |
| 6,292,464 B1 | * | 9/2001 | Elahmadi et al. | 370/223 |

OTHER PUBLICATIONS

Peller et al., "Byteflight Specification Version 0.5 Draft," BMW Specification Draft, 1999, pp. 1-30.
Montgomery et al., "Hybrid Optical Network Architectures for Automotive Applications," Automotive Engineering International, SAE International, US. vol. 107, No. 8, Sep. 1999, pp. 18-24.
Belschner et al., "Requirements Towards an Advanced Communication System for Fault-Tolerant Automotive Applications," VDI Congress 2000, pp. 1-19.

* cited by examiner

*Primary Examiner*—Daniel J Ryman
*Assistant Examiner*—Dinesh Goel

(57) ABSTRACT

A self-routing communication network (100) having: a plurality of nodes (N1-N15); a plurality of star couplers (S1-S4) each having a plurality of inputs and a plurality of outputs; and communication paths coupled between the plurality of star couplers and the plurality of nodes for communication therebetween of frames of information, including at least one redundant communication path (L1-L3), and each of the star couplers sensing which of its inputs first receives a frame and passing only the frame first received. The frames each have a fram-start-sequence (FSS), and the star couplers change the fram-start-sequences before outputting the frame of information e.g. by reducing the size of a frame's fram-start-sequence by a predetermined amount (e.g., 2 bits), whereby interconnection failure may be diagnosed by analyzing the frame-start-sequence.

12 Claims, 4 Drawing Sheets

SELF-ROUTING, STAR-COUPLER-BASED COMMUNICATION NETWORK

FIELD OF THE INVENTION

This invention relates to communication networks and particularly to communication in real-time systems.

BACKGROUND OF THE INVENTION

In the field of this invention it is known that fault-tolerance is a ubiquitous requirement in order to cope with communication errors in such systems.

It is known to provide redundant communication channels, which may be used in the event of failure of a primary communication channel. However, due to technical/economical constraints (increased cost incurred by redundant cabling and additional node interfaces) the number of channels is limited to two in known systems such as the established 'Time-Triggered Protocol' (TTP) and the more-recently proposed 'FlexRay' fault-tolerant real-time automotive communication systems.

It is also known to use intelligent network routers, which can intelligently re-route data transfer in the event of failure in a network link. However, equipping network star couplers (e.g., in systems such as wide/local area networks WAN/LAN) with microprocessors increases the overall system cost significantly. In addition such routers introduce a time delay, which may cause problems in distributed safety-critical applications.

Hence, in summary, prior art solutions have the disadvantages of high costs and/or of additional time delays in the communication path.

A need therefore exists for self routing highly available network architecture based on star couplers wherein the abovementioned disadvantage(s) may be alleviated.

STATEMENT OF INVENTION

In accordance with a first aspect of the present invention there is provided a self-routing network as claimed in claim 1.

In accordance with a second aspect of the present invention there is provided a star coupler as claimed in claim 9.

BRIEF DESCRIPTION OF THE DRAWINGS

One self-routing, highly-available network architecture based on star couplers incorporating the present invention will now be described, by way of example only, with reference to the accompanying drawings, in which.

DESCRIPTION OF PREFERRED EMBODIMENTS

Figure 1:
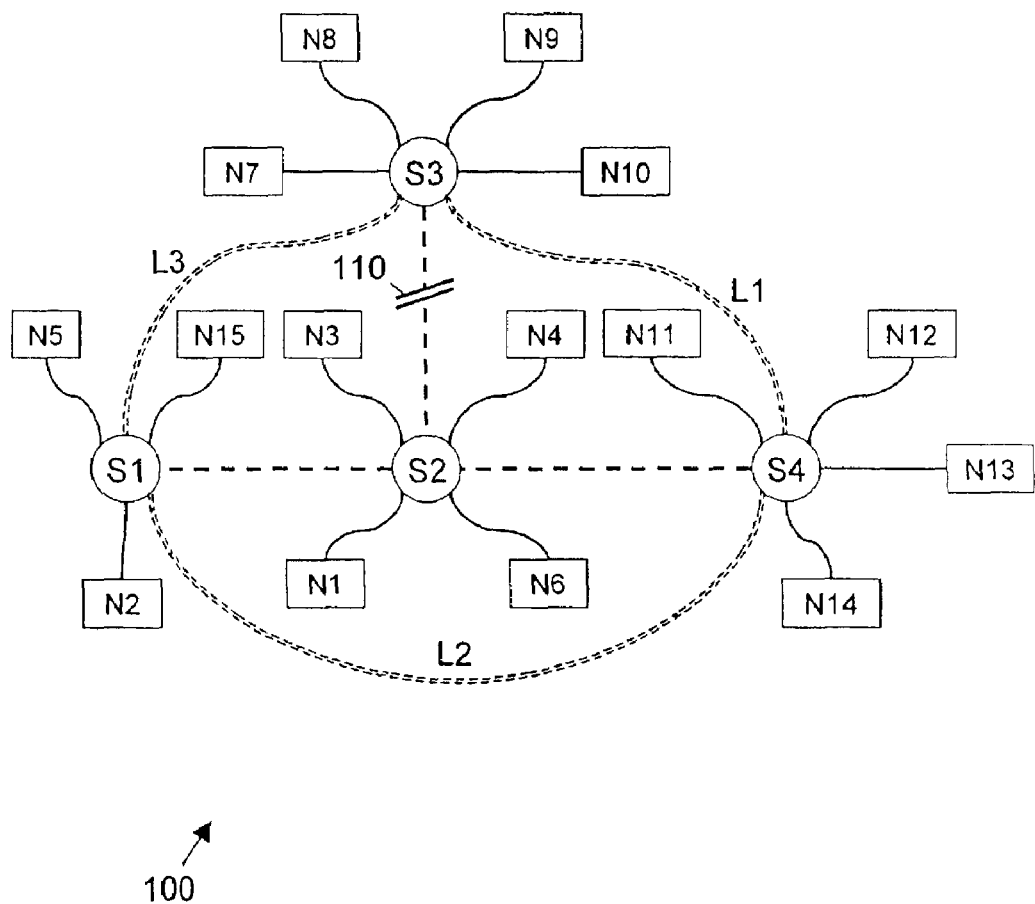
FIG. 1 shows a block-schematic diagram of the network, illustrating links between star couplers and nodes of the network.

Referring firstly to FIG. 1, a self-routing, highly-available, real-time network communication system 100 includes a set of spatially distributed nodes (N1-N15) that is interconnected by a star-based network (comprising star couplers S1-S4 whose interconnection is depicted by single-dash lines) channel providing a single route between any two of the nodes. The nodes communicate by exchanging frames, each of which contains a frame-start-sequence (FSS). As so far described, the system may be, for example, a 'FlexRay' communication system, and need not be described in further detail.

However, in distinction to a known 'FlexRay' communication system, the system 100 adds additional links L1, L2 and L3 (depicted by double-dash lines) between, respectively, the star couplers S3 and S4, the star couplers S1 and S4, and the star couplers S1 and S3. These additional connections between the star couplers prevent partitioning of the network in the event of connection failures among star couplers by providing an alternative communication path. In the configuration shown in FIG. 1, the system 100 can withstand two such connection failures without loss of communication among the nodes. For the purpose of illustration an interruption 110 is marked in FIG. 1 between the star couplers S2 and S3.

As will be discussed in more detail below, the star couplers resolve frame collisions by choosing exactly one input (the first detected input frame) and routing it to the remaining outputs. Each of the star couplers performs this function by continuously scanning its input lines in search of a frame-start-sequence, in a similar manner to that in a known 'FlexRay' system. In a given network the shortest (in the sense of the fastest) connection between star couplers will be found automatically.

Figure 2:
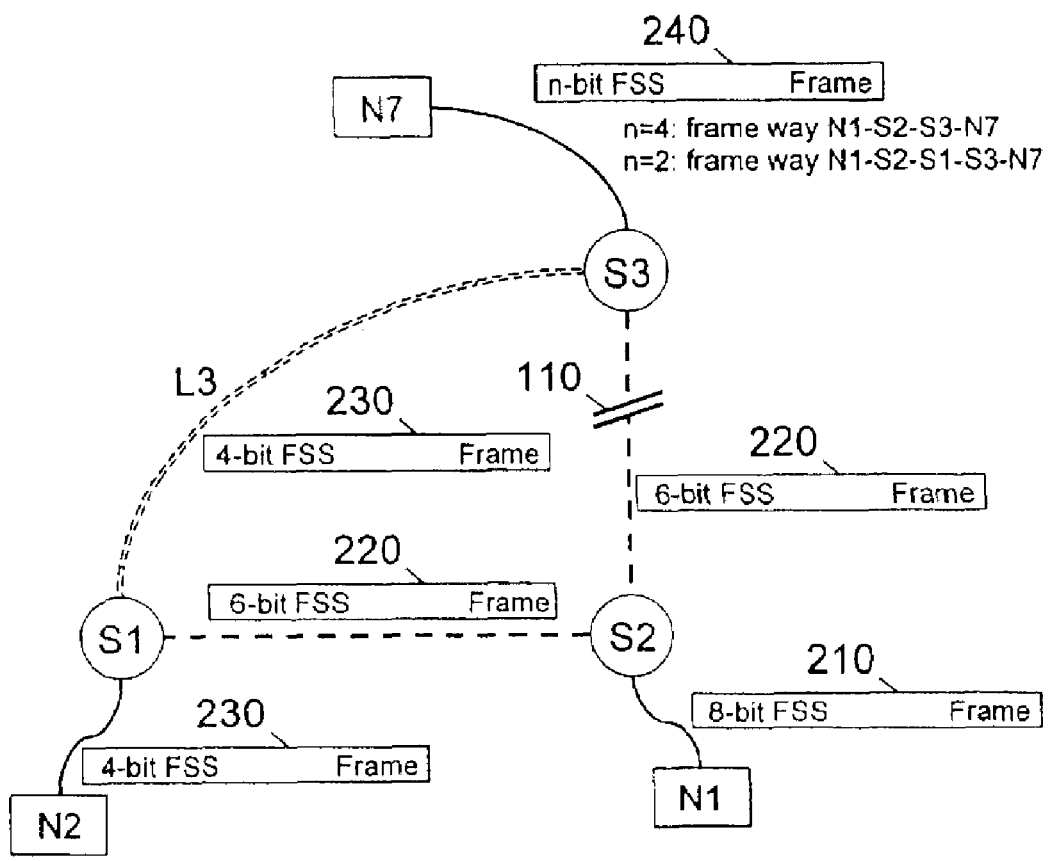
FIG. 2 shows a block-schematic diagram illustrating frame transfer between some of the star couplers and nodes of the network.

Reference is now also made to FIG. 2, which shows a portion of the system of FIG. 1, made up of the nodes N1, N2 & N7, the star couplers S1, S2 & S3, and the links therebetween (including the interruption 110). FIG. 2 illustrates three cases:

Case 1—A single input frame arrives (from the node N1) at the star coupler S2 on one of its inputs (e.g., on input 2), causing this input to be selected and causing the star coupler to output this frame on all others of its outputs.

Case 2—Three input frames arrive at the star coupler S1 (e.g., on inputs 2, 3 and 4). In this case, of these inputs the input from the star coupler S2 (say, input 4) is selected, as it is the first to arrive.

Case 3—At the star coupler S3, the input (e.g., input 1) from the star coupler S1 via the additional link L3 is selected, as it is the first input to be detected (i.e., scanned) by the star coupler.

Diagnosis (i.e., fault detection) is a vital issue for providing real-time availability. In the system of FIG. 1 and FIG. 2, fault detection is achieved as follows. A star coupler (S1, S2, S3 or S4) shortens the frame for output (compared with a selected input frame) by removing or consuming bits from the frame-start-sequence within the star coupler. By analysing a received frame, a receiver node can detect the route taken by the received frame. Shortening the frame-start-sequence may be realized either by (a) internal time base/clock (for timing the occurrence of the predetermined amount of the frame-start-sequence), or (b) bit detection (for detecting the occurrence of the predetermined amount of the frame-start-sequence).

Figure 3:
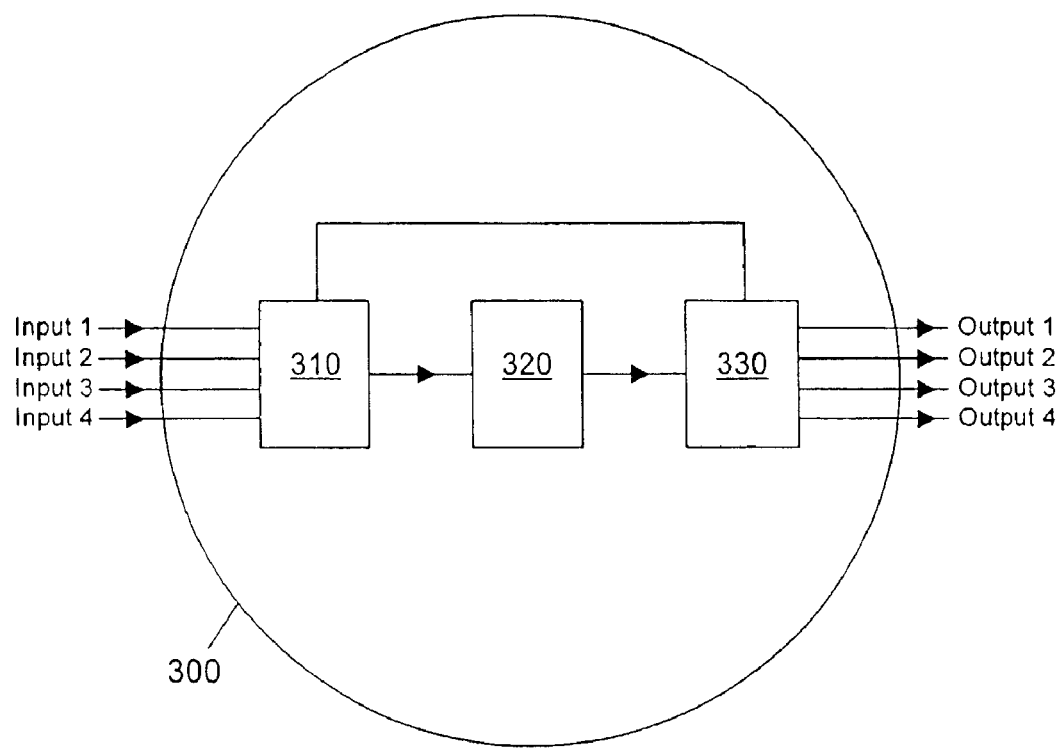
FIG. 3 shows a block-schematic diagram of a star coupler which may be used in the network of FIG. 1 and FIG. 2.

FIG. 3 shows a star coupler (such as the star coupler S1, S2, S3 or S4) 300, which has inputs (four of which are shown), outputs (four of which are shown), an input detector 310, a FSS shortener 320, and an output enabler 330. The input detector 310 (whose detailed structure will be apparent to a person of ordinary skill in the art, and need not be described further) detects which of the inputs is receiving, or is the first to receive a frame-start-sequence, and selects this input. The selected input is applied to the FSS shortener 320 (as mentioned above, either an internal time base/clock or a bit detector—whose detailed structure will be apparent to a person of ordinary skill in the art, and need not be described further), which removes 2 bits (as will be described below) of the frame-start-sequence. The shortened FSS and the following frame data are applied to the output enabler 330, which applies the shortened FSS frame to all outputs other than that which was selected by the input detector 310.

An example of the fault detection procedure referred to above is shown in FIG. 2 (and also in FIG. 4, which will be referred to in more detail below), in which each star coupler removes 2 bits from the frame-start-sequence of a frame which traverses the star coupler.

In the example illustrated, node N1 transmits a frame with an 8-bit frame start sequence 210. From the 8-bit FSS frame 210, the star coupler S2 outputs a 6-bit FSS frame 220. From the 6-bit FSS frame 220, the star coupler S1 outputs a 4-bit FSS frame 230. Since the path between the star couplers S2 and S3 is interrupted, node N7 receives a frame 240 (which, from node 1, has traversed star couplers S2, S1 and S3) with a remaining 2-bit frame-start-sequence as the frame had to pass three star couplers. In comparison, in the fault-free case if there were no interruption between the star couplers S2 and S3, the frame 240 received at node 7 (which, from node 1, would have traversed star couplers S2 and S3) would have a 4-bit frame-start-sequence. Thus, by determining the number of FSS bits in the received frame originating from the node N1, the node N7 can determine whether the frame travelled via the path N1-S2-S3-N7 (4-bit FSS) or the frame travelled via the path N1-S2-S1-S3-N7 (2-bit FSS).

Figure 4:
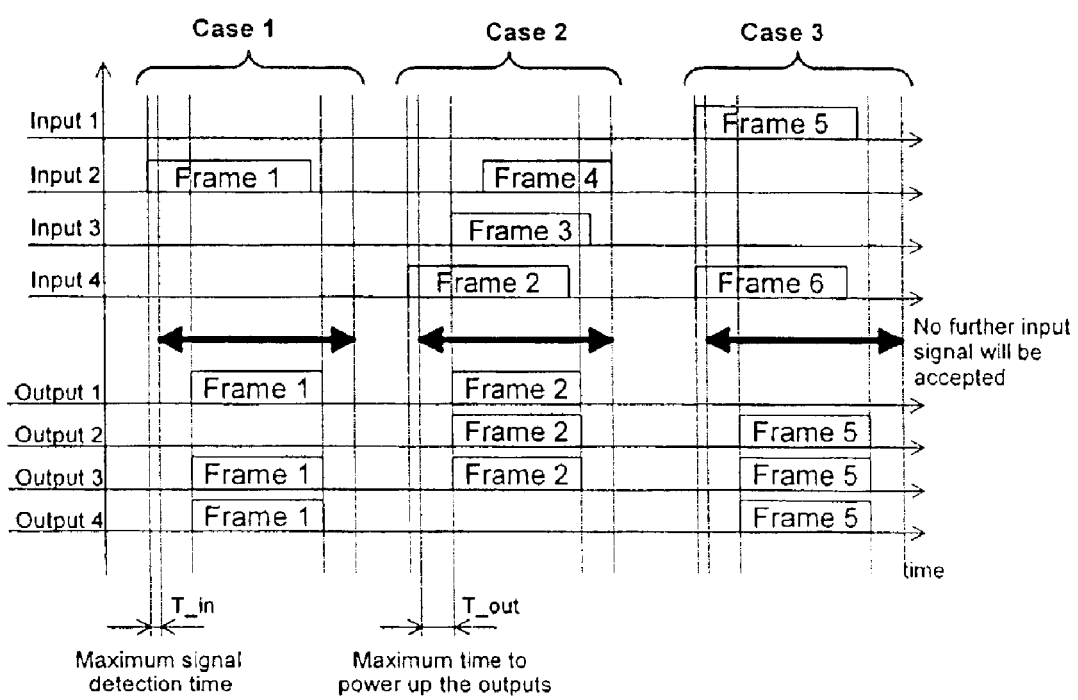
FIG. 4 shows a timing diagram of the frame transfer illustrated in FIG. 2.

Referring now also to FIG. 4, the behaviours of the star couplers S2, S1 and S3 are illustrated respectively for the three cases 1, 2 & 3 referred to above.

Thus, it can be seen that in case 1 (at the star coupler S2) 'Frame 1' arrives (from the node N1) at the input 2 of the star coupler. After a maximum signal detection time T_in, the input 'Frame 1' is selected, and no further input signal is then accepted. After a subsequent maximum time T_out to power up the outputs, the 'Frame 1' (now with 2-bits removed from its FSS) is output at each of the other outputs (outputs 1, 3 and 4) of the star coupler.

In case 2 (at the star coupler S1) 'Frame 2' (from the star coupler node N1 via the star coupler S2) arrives at the input 4 of the star coupler, 'Frame 3' arrives at the input 3 of the star coupler, and 'Frame 4' arrives at the input 2 of the star coupler. After a maximum signal detection time T_in, the input 'Frame 2' is selected, since it the first to arrive, and no further input signal is then accepted. After a subsequent maximum time T_out to power up the outputs, the 'Frame 2' (now with a further 2-bits removed from its FSS) is output at each of the other outputs (outputs 1, 2 and 3) of the star coupler.

In case 3 (at the star coupler S3) 'Frame 5' (from the star coupler node N1 via the star coupler S2 and the star coupler S1) arrives at the input 1 of the star coupler, and 'Frame 6' arrives at the input 4 of the star coupler. After a maximum signal detection time T_in, the input 'Frame 5' is selected, since it the first to be detected, and no further input signal is then accepted. After a subsequent maximum time T_out to power up the outputs, the 'Frame 5' (now with a further 2-bits removed from its FSS) is output at each of the other outputs (outputs 2, 3 and 4) of the star coupler.

It will be understood that the self-routing, highly-available network architecture based on star couplers described above provides the following advantages:

improves the availability of the network by providing additional, alternative communication paths (L1, L2, L3)

enables error detection by detecting if the header length (FSS) is shorter than for shortest path communication, automatic activation of alternative paths based on physical principle of propagation delay (since, if the alternative paths such as L1, L2, L3 are not needed, frames transferred via these redundant paths will not progress further because their longer propagation delay will prevent their frames being selected by further star couplers)

no need for intelligent functions in the star couplers other than selecting the first message and cutting a defined number of FSS bits of the frame.

It will also be understood that variations to the above-described network will be apparent to a person of ordinary skill in the art without departing from the invention.

For example, although the star couplers are described as shortening the frame-start-sequence by 2 bits, the network may be implemented with star couplers which change the frame-start-sequence in any desired manner such that an interconnection failure may be diagnosed by analysing the frame-start-sequence. For example, the frame-start-sequence could be a special frequency (e.g. 50 MHz sine wave) or symbol to activate the input and the star coupler could change this frequency to 40 MHz at its output or would send a different symbol. The next star coupler could change the FSS from 40 to 30 MHz and so on, or would change the symbol again.

Also, for example, although the network has been described in the context of a 'FlexRay' communication system, the network may be implemented in any system employing a deterministic media access scheme such as TDMA (time division multiple access).

The invention claimed is:

1. A self routing communication network, comprising:
a plurality of nodes;
a plurality of star couplers each having a plurality of inputs and a plurality of outputs; and
communication paths coupled between the plurality of star couplers and the plurality of nodes for communication therebetween of frames of information, wherein
the communication paths include at least one alternative communication path;
the star couplers each include an input detector to sense which input of the plurality of inputs of the star coupler first receives a frame of information and for passing only the frame of information first received; and
the frames of information each have a frame-start-sequence, and the star couplers each further include a frame-start-sequence changer to change the frame-start-sequence before outputting the frame such that an interconnection failure is diagnosable by analyzing the frame-start-sequence, the frame-start-sequence changer comprising a shortener to reduce the size of the frame-start-sequence by a predetermined amount.

2. The self-routing communication network of claim 1, wherein the predetermined amount comprises 2 bits.

3. The self-routing communication network of claim 1, wherein the means for reducing the size of the frame-start-sequence comprise clock means for timing the occurrence of the predetermined amount of the frame-start-sequence.

4. The self-routing communication network of claim 1, wherein the means for reducing the size of the frame-start-sequence comprise bit detection means for detecting the occurrence of the predetermined amount of the frame-start-sequence.

5. The self routing communication network of claim 1, wherein the network is based on a deterministic media access scheme.

6. The self routing communication network of claim 1, wherein the network is arranged for real-time communication.

7. A star coupler for use in a self routing communication network having a plurality of nodes coupled via communication paths and a plurality of star couplers for communication of frames of information between the nodes, the star coupler comprising:

a plurality of inputs and a plurality of outputs, the star coupler including an input detector to sense which input of the plurality of inputs of the star coupler first receives a frame of information and for passing only the frame of information first received; wherein the frames of information each have a frame-start-sequence, and the star coupler further includes a frame-start-sequence changer to change the frame-start-sequence in a predetermined manner before outputting the frame of information, the frame-start-sequence changer comprising a shortener to reduce the size of the frame-start-sequence by a predetermined amount, whereby interconnection failure in the network is diagnosable by analyzing the frame-start-sequence.

8. The star coupler of claim 7, wherein the predetermined amount comprises 2 bits.

9. The star coupler of claim 7, wherein the means for reducing the size of the frame-start-sequence comprise clock means for timing the occurrence of the predetermined amount of the frame-start-sequence.

10. The star coupler of claim 7, wherein the means for reducing the size of the frame-start-sequence comprise bit detection means for detecting the occurrence of the predetermined amount of the frame-start-sequence.

11. The star coupler of claim 7, wherein the network is based on a deterministic media access scheme.

12. The star coupler of claim 7, wherein the network is arranged for real-time communication.

* * * * *